(12) United States Patent
Wimmer et al.

(10) Patent No.: US 11,187,623 B2
(45) Date of Patent: Nov. 30, 2021

(54) ELASTICALLY DEFORMABLE DUMMY VEHICLE FOR CARRYING OUT TESTS FOR DRIVER ASSISTANCE SYSTEMS

(71) Applicant: 4activeSystems GmbH, Traboch (AT)

(72) Inventors: Thomas Wimmer, St Georgen am Langsee (AT); Martin Fritz, Kobenz (AT)

(73) Assignee: 4activeSystems GmbH, Traboch (AT)

( * ) Notice: Subject to any disclaimer, the term of this patent is extended or adjusted under 35 U.S.C. 154(b) by 383 days.

(21) Appl. No.: 15/767,984

(22) PCT Filed: Oct. 12, 2016

(86) PCT No.: PCT/EP2016/074410
§ 371 (c)(1),
(2) Date: Apr. 12, 2018

(87) PCT Pub. No.: WO2017/064093
PCT Pub. Date: Apr. 20, 2017

(65) Prior Publication Data
US 2018/0306676 A1    Oct. 25, 2018

(30) Foreign Application Priority Data

Oct. 12, 2015  (DE) .......................... 102015117358.1

(51) Int. Cl.
*G01M 17/007*    (2006.01)
*B62K 25/04*    (2006.01)
(Continued)

(52) U.S. Cl.
CPC ......... *G01M 17/0078* (2013.01); *B60B 1/003* (2013.01); *B60B 1/02* (2013.01);
(Continued)

(58) Field of Classification Search
CPC .... G01M 17/0078; B62D 21/15; B60B 1/003; B60B 1/02; B60B 1/0253;
(Continued)

(56) References Cited

U.S. PATENT DOCUMENTS 3,098,319 A    7/1963    Ellis
3,425,154 A    2/1969    Lindsey et al.
(Continued)

FOREIGN PATENT DOCUMENTS

| CN | 101978250 | 2/2011 |
| CN | 202641983 | 1/2013 |

(Continued)

OTHER PUBLICATIONS

International Search Report for PCT/EP2012/059203.
(Continued)

*Primary Examiner* — Herbert K Roberts
*Assistant Examiner* — John M Royston
(74) *Attorney, Agent, or Firm* — Indiano Law Group LLC; E. Victor Indiano; John T. Woods, III (57) ABSTRACT

The present invention relates to a vehicle (100), in particular a bicycle, for performing tests for a driver assistance system. The vehicle (100) has a base body (101) and at least one strut (102), which is formed to be dimensionally stable without influence of an impact force, which is generatable upon a collision of the vehicle (100) with a collision body, and is elastically deformable upon influence of the impact force. The strut (102) is connected to the base body (101) such that upon influence of the impact force the strut (102) is non-destructively detachable from the base body (101).

15 Claims, 5 Drawing Sheets

(51) Int. Cl.
  *B62K 19/18* (2006.01)
  *B62D 21/15* (2006.01)
  *B60B 1/00* (2006.01)
  *B60B 1/02* (2006.01)
  *B62K 19/00* (2006.01)

(52) U.S. Cl.
  CPC ............ *B60B 1/0253* (2013.01); *B62D 21/15* (2013.01); *B62K 19/00* (2013.01); *B62K 19/18* (2013.01); *B62K 25/04* (2013.01); *B60B 2360/10* (2013.01); *B60B 2900/331* (2013.01); *B62K 2025/041* (2013.01)

(58) Field of Classification Search
  CPC .......... B60B 2360/10; B60B 2900/331; B62K 19/00; B62K 19/18; B62K 2025/041
  See application file for complete search history.

(56) References Cited

U.S. PATENT DOCUMENTS

| | | | |
|---|---|---|---|
| 3,557,471 | A | 1/1971 | Payne et al. |
| 3,583,098 | A | 6/1971 | Bear |
| 4,285,478 | A * | 8/1981 | Stamboulian ............ B60R 22/34 185/45 |
| 5,224,896 | A | 7/1993 | Terzian |
| 5,253,544 | A * | 10/1993 | Allsop .................. B62K 21/14 280/234 |
| 6,120,343 | A | 9/2000 | Migliorati et al. |
| 9,355,575 | B2 | 5/2016 | Fritz |
| 9,870,722 | B2 | 1/2018 | Fritz et al. |
| 2005/0021180 | A1 | 1/2005 | Kwon et al. |
| 2005/0066705 | A1 | 3/2005 | Choi |
| 2005/0155441 | A1 | 7/2005 | Nagata |
| 2006/0075826 | A1 | 4/2006 | Roberts et al. |
| 2010/0078987 | A1 | 4/2010 | Lubecki |
| 2011/0318094 | A1* | 12/2011 | Hensley .................. E06B 3/277 403/217 |
| 2014/0032093 | A1 | 1/2014 | Mills |
| 2014/0102224 | A1 | 4/2014 | Fritz |
| 2015/0175109 | A1 | 6/2015 | Morui |
| 2015/0317917 | A1 | 11/2015 | Fritz et al. |
| 2016/0054199 | A1 | 2/2016 | Fritz |
| 2016/0356674 | A1* | 12/2016 | Chien .................... H01Q 15/14 |

FOREIGN PATENT DOCUMENTS

| | | |
|---|---|---|
| CN | 103569112 | 2/2014 |
| CN | 104724016 | 6/2015 |
| DE | 3901079 | 3/1993 |
| DE | 19802590 | 8/1999 |
| DE | 10 2007 024565 | 2/2008 |
| DE | 102008051233 | 5/2009 |
| DE | 102007035474 | 6/2009 |
| DE | 102008022546 | 11/2009 |
| DE | 102008025539 | 12/2009 |
| DE | 102008030208 | 12/2009 |
| DE | 102011012542 | 2/2011 |
| DE | 102011017146 | 10/2012 |
| EP | 0034864 | 9/1981 |
| EP | 1010919 | 12/1999 |
| EP | 1734352 | 12/2006 |
| EP | 2192567 | 11/2008 |
| EP | 2709739 | 5/2012 |
| FR | 2680902 | 5/1993 |
| GB | 2 469 932 | 11/2010 |
| JP | 2000-167259 | 5/1999 |
| JP | 2000167259 | 6/2000 |
| JP | 2003335286 A | 11/2003 |
| JP | 2008039686 | 2/2008 |
| JP | 2014-515115 | 6/2014 |
| JP | 2014-515115 A | 6/2014 |
| JP | 2018537725 | 12/2018 |
| WO | WO 01/60474 | 8/2001 |
| WO | WO160474 | 8/2001 |
| WO | WO 2009144199 | 5/2009 |
| WO | WO2009103518 | 8/2009 |
| WO | WO 2012/156484 | 11/2012 |
| WO | WO2012156484 | 11/2012 |

OTHER PUBLICATIONS

English Translation of Office Action of Japan Patent Office; dated Nov. 1, 2016.
Advanced crash avoidance Tachnologies Program—Final report of the Honda-DRI Team (Dot HS 811 454 A) Jun. 2011.
International Search Report for PCT/EP2013/058,994 (12 pages).
Cited References WO 2012/156484—Translation of DE 102008025539; DE 102007035474.
Advanced crash avoidance Technologies Program—Final report of the Honda-DRI Team (Dot HS 811 454A) Jun. 2011.
References cited in the ISR (2 pages).
Translations of Abstracts of JP 2000-167259 and JP 2008-039686.
U.S. Department of Transportation; Advanced Crash Avoidance Technologies Program—Final Report of the Honda-DRI Team.
English translation abstract of FR 2680902.
English Translation for DE102008025539 and DE 901079.
Koitabashi, Inetoshi; Assembling bicycle for traffic lecture; English translation of Japanese Patent JP2003335286A; Nov. 25, 2003.
Japanese Patent Office; Official Action in Japanese Application corresponding to Instant Application, Thomas Wimmer Serial No. 15767984, dated JPO Oct. 13, 2020 English translation and original Japanese Action.
Patent Office of the Peoples Republic of China, second office action in corresponding Chinese application.
English Translation of Patent Office of the Peoples Republic of China, second office action in corresponding Chinese application.
English Translation of abstract of Peoples republic of China patent CN202641983.
English Translation of Office Action of Japan Patent Office. dated Apr. 6, 2021.
English Machine Translation of JP 2014-515115A.

* cited by examiner

ELASTICALLY DEFORMABLE DUMMY VEHICLE FOR CARRYING OUT TESTS FOR DRIVER ASSISTANCE SYSTEMS

CROSS-REFERENCE TO RELATED APPLICATIONS

This application is a national phase application derived form the international patent application no. PCT/EP2016/074410 and claims the benefit of the filing date of the German patent application no. 10 2015 117 358.1 filed Oct. 12, 2015, the disclosures of which are hereby incorporated herein by reference.

FIELD OF THE INVENTION

The present invention relates to a vehicle for performing tests for driver assistance systems and a wheel for a vehicle for performing tests for driver assistance systems. Furthermore, the present invention relates to a method for performing tests for driver assistance systems with a vehicle.

TECHNICAL BACKGROUND

For testing of modern vehicle systems, such as for example diverse assistance systems for vehicles, collisions or collision-near situations between the test vehicle to be tested, which has the assistance system, and a further dummy vehicle, such as for example a bicycle with a dummy, are effectuated.

For a collision and/or a collision-near situation between a test vehicle having the assistance system and e.g. a dummy bicycle, for example the test vehicle and/or the dummy bicycle are accelerated to a specified velocity. In order to effectuate a collision situation close to reality, both the test vehicle and the dummy vehicle are set in motion, in order to produce a collision and/or a collision-near situation. Thereby, in particular driver assistance systems can be tested in a close to reality (or realistic) manner as to their function, effectiveness and suitability. Often, collisions cannot be avoided in the tests of such systems.

However, for testing the driver assistance systems, a frequent repetition of the tests is necessary. In particular the manufacture of the dummy vehicle is a significant cost factor in such tests for driver assistance systems. A demolition of the dummy vehicle in collisions thus causes costs, in particular for frequent repetition of collision trials.

SUMMARY OF THE INVENTION

There may be a need to provide a dummy vehicle, which is suitable for a repeated use in tests for driver assistance systems.

This object is solved by a vehicle for performing tests for driver assistance systems, by a wheel for a vehicle as well as by a method for performing tests for driver assistance systems with a vehicle according to the independent claims.

According to a first aspect of the present invention, there is described a (dummy) vehicle for performing tests for driver assistance systems. The vehicle has a base body (or main part) (for example a vehicle frame or a volume body) and at least one strut (or brace). The strut is formed such that without influence (or in the absence of) an impact force, which is generatable (or producible) upon a collision of the vehicle with a collision body (for example the test vehicle having the assistance systems to be tested), the strut is dimensionally stable and that upon influence (or under the effect) of the impact force the strut is elastically deformable. The strut is connected to the base body such that upon influence of the impact force the strut is non-destructively detachable (or releasable) from the base body.

According to a further aspect of the present invention, there is shown a method for performing tests for driver assistance systems with a vehicle as described above. According to the method, a collision of the vehicle with a collision body (for example, the test vehicle having the assistance system to be tested) is produced, such that an impact force is generated. A strut is dimensionally stable without influence of an impact force and upon influence of the impact force the strut is elastically deformable, wherein the strut is connected to the base body such that upon influence of the impact force the strut is non-destructively detachable from the base body.

In a test for driver assistance systems, for example, a test vehicle having an assistance system may be tested. The assistance system may have for example sensors, such as for example radar sensors, which may detect an obstacle, such as for example a further vehicle, and accordingly may communicate passively or actively with the test vehicle. In such tests, for example, the test vehicle may be moved towards a dummy vehicle according to the present invention, wherein both vehicles may have different velocities. Upon a collision (or impact) of the test vehicle with the dummy vehicle, an impact force may be generated. The test vehicle may move, for example, with a velocity of 10 km/h to 100 km/h towards the dummy vehicle, such that the corresponding impact force may be generated upon a collision with the dummy vehicle.

The impact energy, from which the impact force results, may be, for example, in a range between 100 kJ and 800 kJ.

The dummy vehicle according to the present invention may be, for example, a vehicle in the form of a bicycle, a motorbike, a quad, or a walking frame.

The test vehicle having the assistance system to be tested may be, for example, a motorcar, a heavy-goods vehicle or a motorbike.

According to the approach of the present invention, at least one strut of the vehicle may be connected to a base body of the vehicle, such that upon influence (under the effect) of the impact force, the strut may be non-destructively detachable from the base body. At the same time, the strut may be formed elastically deformable.

The expression "elastically deformable" may be understood to mean that the strut (and/or the spoke described below) may alter its shape under the influence (or effect) of the impact force, and may return to its original shape upon discontinuation of the influencing impact force.

By the expression "non-destructively detachable" a connection between the strut and the base body may be defined, which [connection] may release non-destructively on Influence of the impact force. Furthermore, the connection may be designed such that without influence of the impact force the strut and the base body can be held dimensionally stably in a relative position to each other.

The base body may be, for example, a frame, to which a plurality of struts of the type defined in the beginning may be attached. The strut can be inserted, for example, into a receiving bore of the base body, and thus may form a plug-in connection. Furthermore, for example, clamping elements as described below, which may attach the strut to the base body, can be used, such that a non-destructive releasing (or detachment) may be implemented under the influence of the impact force.

The base body with the at least one strut may replicate the shape of a dummy vehicle having true to original geometries. This dummy vehicle may be perceived as a real vehicle by the test vehicle having the assistance systems to be tested. Thus, the function of a driver assistance system can be tested close to reality (or realistically) with the dummy vehicle.

By the dummy vehicle according to the invention, it may be ensured that the risk of a demolition upon a collision is reduced and/or avoided. On influence (or under the effect) of the impact force, the strut may be deformed elastically to give in to (or soften by) the high impact energy.

Thus, a material damage due to the impact force may be circumvented. In addition, due to the impact force and, for example, due to the elastic deformation, the strut can be detached (or released) non-destructively from the base body, such that a wedging of the elements may be reduced, and the risk of damage resulting therefrom can be lowered. Because thus all elements of the vehicle, in particular the base body and the at least one strut, may be indeed detached from each other, but may remain non-destructively (or free of destruction), these elements can be assembled anew in a simple manner for an anew test for a driver assistance system, such that the cost of the provisioning of a new dummy vehicle may become obsolete. Thereby, a dummy vehicle, which may be reusable multiple times, for performing tests for a driver assistance system may be established. At the same time, the strut may be designed, such that without an influence of an impact force the strut may be dimensionally stable. In addition, the connection of the strut to the base body may be designed stably, such that without an influence (or in the absence) of an impact force a force-transmitting connection between the strut and the base body may be possible. Thus, an arbitrarily formed (or shaped) dummy vehicle can be constituted with the strut and the base body.

According to a further exemplary embodiment of the invention, the base body may have a higher rigidity (or stiffness) than the strut.

The base body may consist, for example, of a plastic material or a metal compound. The base body thus may form a reinforcing core of the vehicle. In other words, the base body may be designed more rigid (or stiffer) and less flexible (or resilient) than the at least one strut. Thus, in comparison to the at least one strut, additional fittings, such as for example measurement systems or vehicle components (vehicle saddle, vehicle handle bar), can be fitted more simply to this more rigid base body.

According to a further exemplary embodiment, the base body may have a clamping element, in particular an elastic clamping clip, in which the strut may be attachable releasably by the clamping connection. In this sense, the clamping element may also be designed as a receiving bore in the base body, wherein the strut may be fixed in this receiving bore by a defined press-fit. The clamping element may set a defined posture and direction of the connection, whereby the dummy vehicle can assume the same shape and dimension after the collision. The clamping element may form for example a clamping clip. The clamping clip may be formed from an elastically deformable material. The clamping clip may have a pincer-shaped clamping section, wherein the latter may enclose the strut (or bar) partially. At the same time, the clamping section may clamp the strut. The clamping clip may be connected fixedly to the base body. Alternatively, the clamping clip can also be connected fixedly to the strut and can be attached detachably (or releasably) to a frame element of the frame by a clamping connection.

Upon the (or on) influence of the impact force, the strut may detache from the clamping clip, without the latter being destroyed due to its elastic deformability. For an anew performing of a test for a driver assistance system, the strut can be attached to the clamping clip anew.

Furthermore, it may be possible, that by a use of the clamping clip the strut can be shifted (displaced longitudinally) along its longitudinal direction relative to the clamping clip upon influence of the impact force, without the strut detaching from the clamping clip.

According to a further exemplary embodiment, the strut may be formed from an elastic plastic material having a modulus of elasticity from approximately 1000 N/mm$^2$ to approximately 3000 N/mm$^2$.

According to a further exemplary embodiment, the strut may have an elastic limit (or yield strength) of 40 N/mm$^2$ to 70 N/mm$^2$. According to a further exemplary embodiment, the vehicle may have an elastic pulling element (or tie), which may be connected to the base body and the strut, such that upon influence of the impact force the pulling element may remain attached at least to the base body or the strut, and deforms elastically. At the same time, the elastic pulling element may transmit exclusively tensile forces between the base body and the strut.

The elastic pulling element may be formed, in particular, such that it may have a higher ductility and/or a higher elastic deformability than the strut. Thus, the elastic pulling element may deform elastically upon influence of the impact force, without a connection to the strut and/or the base body being detached (or released). Thus, the strut may detach non-destructively from the base body, is however held furthermore, for example, due to the elastic pulling element indirectly to the base body. On the one hand, the elastic pulling element may contribute further to the damping of the impact force. On the other hand, after the impact, i.e. after releasing the strut from the base body, the strut may be connected furthermore to the base body via the elastic pulling element. Thus, the strut can be furnished quickly to the detachment point at the base body in a simple and quick manner, and may be attached thereto.

In a further exemplary embodiment, the elastic pulling element may be formed as an elastic ribbon, as an elastic rope, or as an elastic chain.

According to a further exemplary embodiment, the strut may have a hollow profile, wherein the elastic pulling element may extend within the hollow profile. In other words, the strut may form a form of a tube. For example, the strut may be a pipe (or liner), which may have the desired elastic properties.

According to a further exemplary embodiment, the base body may be a frame consisting of plural, in particular three, frame elements, which may be connected to each other.

The frame elements may represent, for example, rods (or bars), which may be connected to each other and which may form a load-bearing assemblage and/or frame. The frame elements may be formed in particular more robust and less ductile than the struts. Furthermore, the frame elements may be deformable elastically. The frame elements may have, for example, a hollow profile. Furthermore, the frame elements may be formed, for example, from fiber-reinforced composites, from metal basic materials or from a plastic material.

According to a further exemplary embodiment, respectively two frame elements may be connected to each other at a joining link (or connector). The joining link may represent, for example, a rigid and/or stable element of a solid material. The joining link may have, for example, a corresponding receiving bore, into which the corresponding frame elements can be inserted. At the same time, the frame elements can be attached in the corresponding receiving bore in the sense of a press-fit. The frame elements can be attached in a corresponding receiving bore in particular longitudinally displaceable, such that upon influence of the impact force the frame elements may remain in the receiving bore, may however be shifted longitudinally displaceably in the direction of their extension length within the receiving bore. Thus, a further damping of the impact force can be generated.

Furthermore, in a further exemplary embodiment, a damping element, for example a rubber damper or another hydraulic or pneumatic damper, may be integrated in the frame, in particular between the frame elements, in order to confine the impact force.

According to a further exemplary embodiment, the vehicle may have a vehicle handle bar. The joining link may have a receiving bore, wherein the vehicle handle bar may be insertable detachably into the receiving bore. Typically, the hands of a human-like dummy may be attached to the vehicle handle bar.

Upon influence of the impact force, accordingly, a tensile force may be transmitted from the hands of the dummy to the vehicle handle bar, such that the vehicle handle bar may be pulled out of the receiving bore. Thus, the hands of the dummy together with the vehicle handle bar may detach from the frame, and in particular the upper body of the dummy may rotate and may move away from the receiving bore. This rotating away of the upper body of the dummy in turn may produce a reduction of the initial impact force, such that the collision may be absorbed (or intercepted) better for the dummy. If the dummy simulates a bicycle driver, an impact energy of the dummy on the test vehicle having the driver assistance systems can also be reduced by this rotating-away movement, such that potential damages of the test vehicle due to the dummy may be minimized.

According to a further exemplary embodiment, the vehicle may have a vehicle saddle, wherein the joining link has a receiving bore. The vehicle saddle may be insertable detachably into the receiving bore.

According to a further exemplary embodiment, the vehicle may have a dummy element, which may be attachable to the frame, in particular to the vehicle saddle.

According to a further aspect of the present invention, there is described a wheel for a vehicle, in particular the vehicle described above, for performing tests for a driver assistance system. The wheel has a wheel hub and a spoke (or radius arm). The spoke is designed, such that without influence (or in the absence) of an impact force, which is generatable upon a collision of the vehicle with a collision body (for example, the test vehicle having the assistance systems to be tested), the spoke is dimensionally stable, and that upon influence (or under the effect) of the impact force the spoke is elastically deformable. A first end of the spoke is connected to the wheel hub, such that upon influence of the impact force the spoke is non-destructively detachable (or releasable) from the base body and/or the wheel hub.

The spoke may be formed, for example, according to the strut described above. The wheel hub may be formed, for example, according to the above described base body of the vehicle.

The wheel hub may be designed more massively (or more solidly) and less flexibly (or less resiliently), e.g. less ductile, than the spoke. The wheel hub may further have, for example, a ball bearing or a fulcrum pin, such that the wheel hub may be rotatably attachable, for example, to a strut of the vehicle described above.

For example, a plurality of spokes, for example 10 to 25, in particular approximately 15, spokes of the type described above may be arranged at the wheel hub.

The expression "elastically deformable" may be understood to mean that the spoke can change its shape under the influence of the impact force, and returns to its original shape upon discontinuation (or abolition) of the influencing impact force.

By the expression "non-destructively detachable" a connection between the spoke and the wheel hub may be defined, which [connection] detaches (or releases) non-destructively upon an influence of the impact force.

Furthermore, the connection may be designed such that without influence of the impact force the spoke and the base body can be held dimensionally stably in a relative position to each other.

In order to implement this non-destructive detachability (or releasability), the spoke can be inserted, for example, with its first end into a receiving bore of the wheel hub loosely or in the sense of a clearance fit, such that upon influence of the impact force the spoke may deform elastically and may slide out of the receiving bore. Furthermore, a clamping element, such as for example a clamping clip of the type described initially, can be attached, for example, to the wheel hub, to which the spoke can be clamped in the framework of a clamping connection.

If the vehicle is a bicycle and/or another two-wheeler, and the wheel described above is a rear wheel, then the first contact between a test vehicle having the driver assistance systems and the vehicle may occur at the rear wheel of the vehicle. Due to the elastic deformability as well as the non-destructively detachable attachment of the spokes to the wheel hub, a demolition (or destruction) of the wheel hub and/or the spoke upon the influence of the impact force can be avoided. After a collision, the spoke can be connected anew to the wheel hub in a simple manner and can be used for an anew test for a driver assistance system.

According to an exemplary embodiment, the vehicle may have this wheel described above. The wheel hub of the vehicle may be attached rotatably to the strut. In particular, the wheel hub of the vehicle may be attached non-destructively detachable to the strut, such that upon influence of the impact force the strut may detache (or release) from the wheel hub.

Thus, the wheel can be attached in particular rotatably to the vehicle. During the test, the wheel can rotate, for example due to a contact with the underground, such that a simulation close to reality may be made possible during the test.

According to a further exemplary embodiment, a further elastic pulling element, for example a rubber rope, an elastic chain or a rubber ribbon, may be attached between the base body, in particular a joining link, to which the vehicle saddle is attachable, and the wheel hub.

During a collision of the test vehicle having the assistance system to be tested with the wheel, the latter may be pushed and/or pulled under the test vehicle due to the sticking friction with the ground. Thus, the test vehicle could drive over the wheel, and may destroy the components. This may be avoided by attaching the elastic pulling element, because the pulling element may pull the wheel hub in particular in the direction towards the vehicle saddle, and thus may avoid that the wheel is pulled under the test vehicle.

In the following, further exemplary embodiments of the wheel are described:

According to a further exemplary embodiment of the wheel, the wheel may have a wheel rim element, which may be formed circularly. The spoke may be, with a second end, attached to the wheel rim element.

According to a further exemplary embodiment, the wheel rim element may have at least one receiving bore, into which the second end of the spoke may be inserted into the receiving bore of the wheel hub, such that upon influence of the impact force the spoke may be non-destructively detachable from the wheel rim element.

The wheel rim element may be designed in particular elastically deformable. The spokes may be clamped between the wheel rim element and the wheel hub, wherein the spokes can detach (or release) non-destructively from at least the wheel rim element or the wheel hub, if the impact force exerts influence. The wheel rim element may have, for example, a plastic material.

Furthermore, the wheel rim element may be [made from] an elastic deformable hard rubber.

According to a further exemplary embodiment, the wheel rim element may consist of an elastically deformable ribbon, which may be connected at the respective ends to each other.

The ribbon may have, for example, a width of approximately 20 to 50 millimetres, in particular of approximately 30 to 40 millimetres. Furthermore, the ribbon may have a thickness of approximately 2 to 10 millimetres, in particular of approximately 3 to 6 millimetres. According to a further exemplary embodiment, the wheel may have an elastic limit (or yield strength) from 40 N/mm$^2$ to 70 N/mm$^2$.

Due to the elastically deformable ribbon, which may be connected with its ends, an elastically deformable wheel rim element can be provided, wherein this element can also be warped (or twisted) in itself, if the impact force may be transmitted. Subsequently, this element can unwind itself due to the implementation of the ribbon shape, and may deform itself back to the circular initial shape.

According to a further exemplary embodiment, the wheel rim element may have a metal coating or metal elements, e.g. metallic sheet (or film) elements and/or an aluminium sheet, which may be arranged one after another, in particular spaced at a distance from each other, along a circumference of the wheel rim element. The metal elements may have a greater thickness than a thickness of the wheel rim element.

The metal elements may have at least one metallic surface coating (and may consist, for example, of a plastic material), or may consist of a metal compound, in particular of an aluminium compound.

If the ribbon of the wheel rim element consists in particular of a plastic material, assistance systems and/or its sensors may not localize (or fix a position) It [the ribbon]. In real vehicles, the wheel rim elements may be fabricated usually of metal, which may be detected by the sensors of the assistance systems. In order to nevertheless simulate a real wheel rim element, metal elements can be arranged in the circumference direction on the wheel rim element that may consist e.g. of a plastic material. The metal elements can be arranged, for example, spaced at a distance from each other, along the circumference direction at the wheel rim element. Thus, the wheel rim element can deform elastically between the metal elements, wherein at the same time due to the metal elements, a detection of the wheel rim element may be made possible. Thus, an assistance system can be tested close to reality with the wheel according to the invention.

The metal elements may further have a greater thickness than the ribbon of the wheel rim element. Furthermore, the metal elements may have a length in the circumference direction from 2 to 4 centimetres.

According to a further exemplary embodiment, a filling material (or padding), in particular an air hose or an elastically foamed material (e.g. a foamed plastic material), may be applied on a radial outer surface of the wheel rim element. For example, the ribbon of the wheel rim element may be formed thinly in order to ensure the elastic deformability on the one hand and a sufficiently stable shape conservation without influence of the impact force [on the other hand]. In order to replicate realistically a wheel rim of a real wheel frame, the filling material can be applied. The filling material may be, for example, elastically deformable, even without influence of the impact force. The filling material may have, for example, a thickness in the radial direction of the wheel from approximately 20 to 50 millimetres.

According to a further exemplary embodiment of the present invention, a tyre, in particular a rubber tyre, may be arranged at a radial outer surface of the wheel rim element. The tyre can be for example a usual profile tyre for vehicles, for example a bicycle tyre (mantle), which may have a usual tyre profile. The filling material can be arranged, for example, between the tyre and the wheel rim element.

According to a further exemplary embodiment, the wheel may have an elastic pulling element (or tie). The elastic pulling element can be designed according to the pulling element for the vehicle as described initially. The elastic pulling element may be connected to the wheel hub and the spoke, such that upon influence of the impact force the pulling element remains attached to the wheel hub and the spoke.

In addition or alternatively, the elastic pulling element may be connected to the wheel rim element and the spoke, such that upon influence of the impact force the pulling element may remain attached to the wheel rim element and the spoke, wherein the elastic pulling element may transmit exclusively tensile forces between the wheel rim element and the spoke.

The elastic pulling element may be formed as an elastic ribbon, as an elastic rope or as an elastic chain.

The elastic pulling element may be formed in particular such that it has a higher elastic deformability than the spoke. Thus, the elastic pulling element can deform elastically upon influence of the impact force, without the pulling element releasing a connection to the spoke and/or the wheel hub and/or the wheel rim element. Thus, the spoke can detach non-destructively from the wheel hub and/or the wheel rim element, may however be held furthermore indirectly on the wheel hub and/or the wheel rim element, for example, due to the elastic pulling element. On the one hand, the elastic pulling element may contribute further to the damping of the impact force. On the other hand, after the impact, i.e. after the releasing of the spoke from the base body, the spoke may be furthermore connected to the wheel hub and/or the wheel rim element via the elastic pulling element. Thus, the spoke can be quickly supplied and attached to the attachment point on the wheel hub and/or the wheel rim element in an easy and quick manner.

According to a further exemplary embodiment, the spoke may have a hollow profile. The elastic pulling element may extend within, or in parallel outside of, the hollow profile.

The hollow profile of the spoke may have, for example, an outer diameter from approximately 8 to 12 millimetres. The spoke can have, for example, a wall thickness of 2 to 4 millimetres.

According to a further exemplary embodiment, the elastic pulling element may have a thickening, in particular a knot, wherein the thickening is larger than an opening cross-section of the hollow profile. Thus, for example, the elastic pulling element can be inserted through the hollow profile of the spoke, and may protrude at a front face. At this protrusion for example a knot or another thickening can be provided for, such that a slipping through into the interior of the hollow profile may be prevented. In addition, the wheel hub or the wheel rim element may have an according bore, through which the elastic pulling element may be guided through, and a knot or another thickening can be provided for at the elastic pulling element on the side of the wheel hub or of the wheel rim element, which side may be opposite to the spokes. Thus, a slipping back and/or a releasing of the elastic pulling element upon a load by the impact force can be avoided.

It is pointed out that the embodiments described herein represent only a limited selection of possible embodiment variants of the invention. Thus, it is possible to combine the features of individual embodiments with each other in a suitable manner, such that a plurality of different embodiments is to be considered as obviously disclosed for the skilled person with the embodiment variants that are explicit herein. In particular, some embodiments of the invention are described by device claims and other embodiments of the invention are described by method claims. However, it will become apparent to the skilled person upon reading this application that, unless it is not explicitly stated to the contrary, in addition to a combination of features, which belong to one type of the invention subject, also an arbitrary combination of features, which belong to different types of invention subjects, are possible.

SHORT DESCRIPTION OF THE DRAWINGS

In the following, embodiment examples are described in more detail for a further explanation and for a better understanding of the present invention with reference to the appended drawings. In the drawings.

DETAILED DESCRIPTION OF EXEMPLARY EMBODIMENTS

Same or similar components in different figures are provided with same reference numerals. The views in the figures are schematic.

The present invention relates to a vehicle 100, in particular a bicycle, for performing tests for a driver assistance system. The vehicle 100 may have a base body 101 and at least one strut 102, which may be designed to be dimensionally stable without influence of an impact force, which may be generatable upon an impact of the vehicle 100 with a collision body, and to be elastically deformable upon influence of the impact force. The strut 102 may be connected to the base body 102, such that upon influence of the impact force the strut 102 may be non-destructively releasable from the base body 101.

Figure 4:
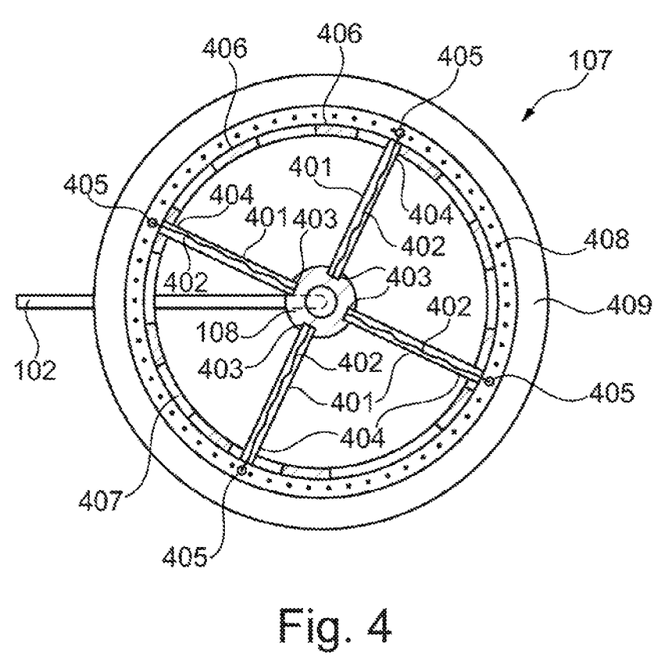
FIG. 4 shows a wheel for a bicycle from FIG. 1, according to an exemplary embodiment of the present invention.
Figures 5, 6:
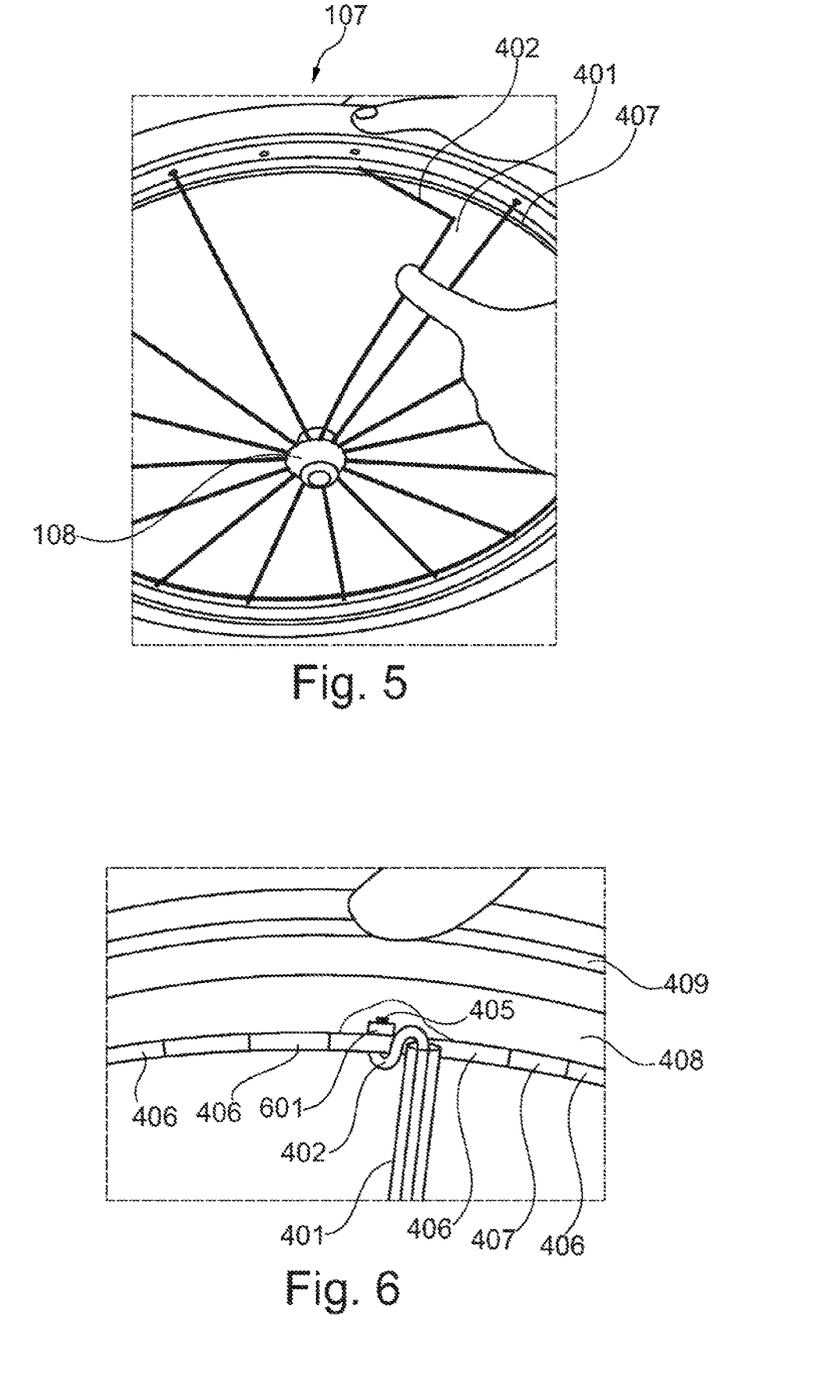
FIG. 5 shows a schematic view of a wheel from FIG. 4 having an elastic pulling element, according to an exemplary embodiment of the invention.
FIG. 6 shows a magnified view of a wheel construction, according to an exemplary embodiment of the present invention.

The bicycle 100 further may have, for example two, wheels 107 according to an exemplary embodiment of the present invention, which are explained in detail in FIG. 4 to FIG. 6.

In such tests for a driver assistance system, for example the test vehicle may be moved towards the dummy vehicle 100, wherein both vehicles may have different velocities. Upon a collision of the test vehicle with the dummy vehicle 100, an impact force may be generated. The test vehicle may move, for example, with a velocity of 10 km/h to 100 km/h, towards the dummy vehicle 100, such that the corresponding impact force may be generated upon a collision with the dummy vehicle.

Figure 1:
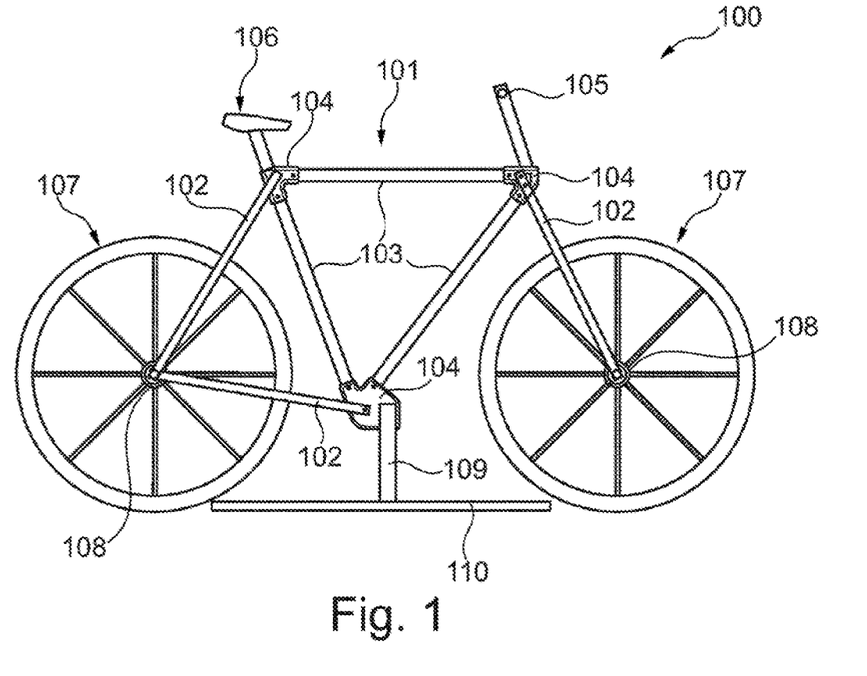
FIG. 1 shows a bicycle as a vehicle having two wheels, according to an exemplary embodiment of the present invention.

In the embodiment example of FIG. 1, the vehicle 100 is a bicycle, which may have a frame as the base body 101. The frame may consist of three frame elements 103, wherein respectively two of the frame elements 103 may be attached to each other. The strut 102 of the vehicle 100 may be connected to a frame element 103 such that upon influence of the impact force the strut 102 may be non-destructively detachable (or releasable) from the frame elements 103. At the same time, the strut 102 may be formed elastically deformable. The vehicle 100 according to the embodiment example in FIG. 1 may have, for example, a plurality of struts 102. Thus, in the rear section, a strut 102 can connect a second section of the vehicle to a wheel hub 108. In the front section of the vehicle, for example, a strut 102 can connect a wheel hub 108 of a front wheel 107 to a handle bar section of the bicycle 100.

The struts 102 can be inserted, for example, into a receiving bore of the base body 102 and/or into joining links 104 of the frame as described further below, and thus may form a plug-in connection. Furthermore, for example, clamping elements 201 described below can be used, which may attach the strut 102 to the base body 101, such that upon influence of the impact force a non-destructive detachment (or releasing) may be implemented.

The base body 101 with at least the struts 102 may replicate the shape of a dummy vehicle 100 with true to original geometries. This dummy vehicle may be perceived by the test vehicle having the assistance systems to be tested as a real vehicle. Thus, the function of a driver assistance system can be tested close to reality with the dummy vehicle 100.

The base body 101 and/or the frame element 103 thus may form a reinforcing core of the bicycle 100. In other words, the base body 101 may be formed more rigid (or stiffer) and less ductile than the at least one strut 102. Thus, additional fittings, such as, for example, measurement systems or vehicle components (vehicle saddle 106, vehicle handle bar 105) can be fitted more simply to this more rigid base body 101 than in comparison to the at least one strut 102. The frame elements 103 can represent, for example, rods (or bars), which may be connected to each other and which may form a load-bearing assemblage and/or frame. The frame elements 103 may be formed in particular more robust and less ductile than the struts 102. Furthermore, the frame elements 103 can be elastically deformable. The frame elements 103 can have, for example, a hollow profile.

E.g. respectively two frame elements 103 may be connected to each other at a joining link (or connector) 104. The joining link 104 may represent, for example, a rigid and/or stable element made of a solid material. The joining link 104 can have, for example, a corresponding receiving bore, into which the corresponding frame elements 103 can be inserted (see FIG. 2). At the same time, the frame elements 103 can be attached in the corresponding receiving bore in the sense of a press-fit. The frame elements 103 can be attached in particular longitudinally displaceable in a corresponding receiving bore, such that upon influence of the impact force the frame elements 103 may remain in the receiving bore, may however be shifted within the receiving bore longitudinally displaceably in the direction of their extension length. Thus, a further damping of the impact force can be generated.

A joining link 104 may have a further receiving bore, wherein the vehicle handle bar 105 may be insertable detachably (or releasably) into the receiving bore. Typically, the hands of a human-like dummy 701 (see FIG. 7) may be attached to the vehicle handle bar 104. Upon influence of the impact force, accordingly, a tensile force may be transmitted from the hands of the dummy 701 to the vehicle handle bar 105, such that the vehicle handle bar 105 may be pulled out of the receiving bore. Thus, the hands of the dummy 701 together with the vehicle handle bar 105 may detach from the frame, and in particular the upper body of the dummy 701 may rotate and may move away from the receiving bore.

Furthermore, a vehicle saddle 106 is shown, wherein the corresponding joining link 104 may have a receiving bore, into which the vehicle saddle may be insertable releasably. Furthermore, a dummy 701 can also be attached to the frame without a vehicle saddle 106.

The bicycle and/or vehicle 100 further may have a rod (or bar) 109, which is attached to a lower joining link 104. The rod 109 may hold the bicycle and/or vehicle 100 on a displaceable base element 110. The displaceable base element 110 can be pulled over the ground, for example, during a test, such that a driving of the bicycle and/or vehicle 100 may be simulated.

As is shown in FIG. 1, the wheels 107 and the base element 110 may rest on the ground. Thus, upon a driving of the base element 110 the bicycle and/or vehicle 100 may be displaced, whereupon the wheels 107 may rotate due to the sticking friction with the ground. Thus, a realistically driving bicycle and/or vehicle 100 may be simulated.

The rod 109 can be attached non-destructively releasably to the lower joining link 104. Furthermore, a joint (or articulation) or a clamping connection between the rod 109 and the lower joining link 104 can be provided there.

Figure 2:
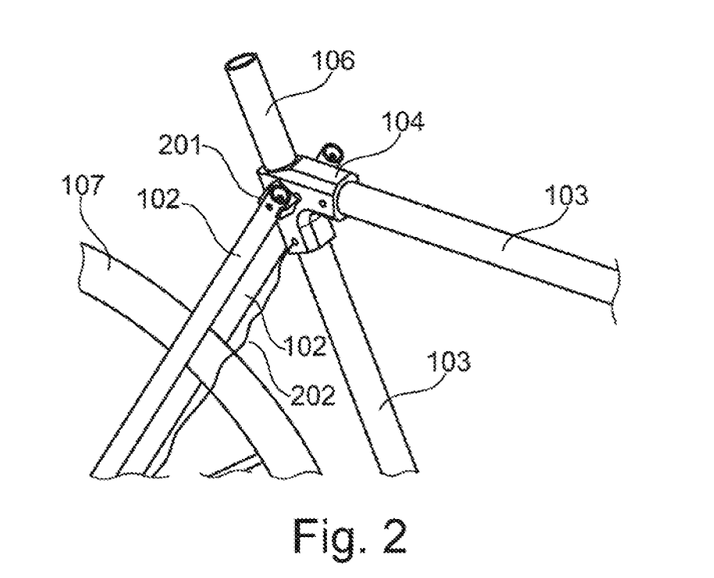
FIG. 2 shows a magnified perspective view of a joining area at a vehicle saddle between a frame and a strut of the bicycle from FIG. 1.

FIG. 2 shows a magnified perspective view of a joining area at the vehicle saddle 106 between the frame and the struts 103 of the bicycle 100 from FIG. 1.

In particular, two struts 102 are shown, which may be guided from a wheel hub 108 to the shown joining link 104. A clamping element 201, in particular an elastic clamping clip, may be attached to the joining link 104, in which clamping element 201 the corresponding strut 102 may be attached releasably by a clamping connection. The clamping clip 201 may have a piercer-shaped damping section, wherein the latter may enclose the strut 102 partially. At the same time, the clamping section may clamp the strut 102. The clamping clip 201 may be fixedly connected to the base body.

Upon influence of the impact force, the strut 102 may detache from the clamping clip 201, without the latter being destroyed due to its elastic deformability. For an anew performing of a test for a driver assistance system, the strut 102 can be fixed anew to the clamping clip 201.

Furthermore, it may be possible, that the strut 102 can be shifted (longitudinally displaced) along its longitudinal direction relative to the clamping clip due to the use of the clamping clip 201, without the strut 102 releasing from the clamping clip 201.

Furthermore, an elastic pulling element 202, for example a rubber ribbon, is shown in FIG. 2, which pulling element may be connected to the joining link 104 in the saddle area 106 and the strut 102 or the wheel hub 108 (not represented) of the wheel 107, such that upon influence of the impact force the pulling element 202 may remain attached at least to the joining link 104 or the strut 102 and/or the wheel hub 108, and may deform elastically.

The elastic pulling element 202 can deform elastically upon the influence of the impact force, without this releasing a connection to the strut 102 and/or the base body 101. Thus, the strut 102 can release non-destructively from the base body, may however be held furthermore indirectly at the base body 102, for example, due to the elastic pulling element 202. On the one hand, the elastic pulling element 202 may contribute further to a damping of the impact force. On the other hand, after a collision, i.e. after the detachment of the strut from the base body 101, the strut 102 may be connected via the elastic pulling element 202 to the base body 101. Thus, the strut 102 can quickly be provided and fixed to the attachment point at the base body 101. Furthermore, the pulling element 202 can in particular be pre-stressed, in order to pull the strut 102 upwards. The elastic element 202, which may hold the strut 102 to the joining link 104, may be e.g. an additional elastomer rope, which may be connected fixedly to the strut 102 and the joining link 104.

Furthermore, the elastic pulling element 202 can be fixed to the wheel hub 108 of the wheel 107 on the one hand and on the other hand to the joining link 104, to which, for example, the vehicle saddle 106 may be attached. This may have the advantage that upon releasing the wheel 107 by the pulling element 202 the latter may be pulled in the direction of the vehicle saddle 106 and thus e.g. away from the ground. During a collision of a test vehicle having the assistance system to be tested with the wheel 107, the latter may be pushed and/or pulled under the test vehicle due to the sticking friction with the ground. Thus, the test vehicle could drive over the wheel 107 and destroy the components. On applying the elastic pulling element 202, this may be prevented, because the pulling element may pull the wheel hub 108 in particular in the direction of the vehicle saddle 106, and thus may prevent that the wheel 107 is pulled under the test vehicle.

As is further shown in FIG. 2, the strut 106 may have a hollow profile, wherein the elastic pulling element 202 can extend within the hollow profile.

Figure 3:
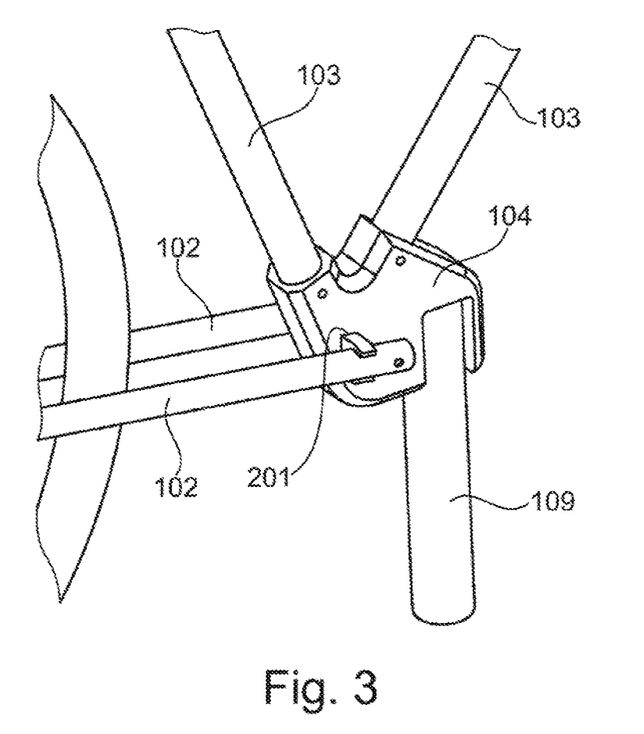
FIG. 3 shows a magnified perspective view of a further joining area between a frame and a strut of the bicycle from FIG. 1.

FIG. 3 shows a magnified perspective view of a connection section at a lower section of the bicycle 100 from FIG. 1. At the joining link 104 shown there, corresponding frame elements 103 may be inserted into receiving bores. Furthermore, clamping clips 201 may be fixed to the side sections of the joining link 104. Respectively, struts 102, which may extend in a rear section of the bicycle 100, where they may be connected to the wheel hub 107, may be attached to the joining links 201.

Furthermore, the rod 109 is shown, which may be arranged in a receiving opening of the joining link 104. As is shown in FIG. 3, the rod 109 may be supported hingedly and can fold over to the side. Thus, the vehicle 100 can fold over, for example, upon a collision from the side with the test vehicle.

FIG. 4 shows a wheel 107 for a vehicle 100 from FIG. 1 according to an exemplary embodiment of the present invention. The wheel 107 may have a wheel hub 108 and a spoke (or radial arm) 401. The spoke 401 may be designed such that without influence of an impact force, which may be generatable upon an impact of the vehicle 100 with a collision body (for example the test vehicle having the assistance systems to be tested), the spoke 401 may be dimensionally stable, and that upon influence of the impact force the spoke 401 may be elastically deformable. A first end 403 of the spoke 401 may be connected to the wheel hub 108, such that upon influence of the impact force the spoke 401 may be non-destructively detachable (or removable) from the wheel hub 108 (and/or a base body).

The spoke 401 can be designed, for example, according to the strut 102 described above with different geometrical dimensions.

The wheel hub 108 may be formed more massively (or more solidly) and less ductile than the spoke 401. The wheel hub 108 further may have, for example, a ball bearing or a fulcrum pin, such that the wheel hub 108 may be attachable rotatably, for example, to a strut 102 of the vehicle 100 described above. In order to implement the non-destructive detachability, the spoke 401 can be inserted with its first end into a receiving bore of the wheel hub 108 loosely or in the sense of a clearance fit, such that upon influence of the impact force the spoke 401 may deform elastically and can slide out of the receiving bore. A clamping element 201, such as for example a clamping clip of the type described at the beginning, can be fixed, for example, to the wheel hub 108, in which clamping element 201 the spoke 401 can be clamped in the framework of a clamping connection.

For example, a plurality of spokes 401, for example 10 to 25, in particular approximately 15, spokes of the type described above, can be arranged at the wheel hub 108. Only four spokes 401 are shown in FIG. 4 for a better clearness.

The wheel hub 108 may be fixed rotatably to the shown strut 102. In particular, the wheel hub 108 may be fixed non-destructively detachably to the strut 102, such that upon influence of the impact force the strut 102 may detach from the wheel hub 108.

The wheel 107 further may have a wheel rim element 407, which may be formed circular. The spokes 401 may be fixed with a second end 404 to the wheel rim element 407. The wheel rim element 407 may have at least one receiving bore (blind hole or through-hole), into which the second end 404 of the spoke 401 may be inserted, such that upon influence of the impact force the spoke 401 may be detachable non-destructively from the wheel rim element 407.

The wheel rim element 407 may be formed in particular elastically deformable. The spokes 401 may be clamped between the wheel rim element 407 and the wheel hub 108, wherein the spokes 401 can detach non-destructively from at least the wheel rim element 407 or the wheel hub 108, if the impact force exerts an influence.

The wheel rim element 407 may consist of an elastically deformable ribbon, which may be connected at the corresponding ends to each other. Due to the elastically deformable ribbon, which may be connected with its ends, an elastically deformable wheel rim element 407 can be provided, wherein the latter can also be twisted in itself if the impact force is transmitted. Subsequently, the latter can unwind due to the formation of the ribbon shape, and may deform back in its circular initial shape.

Furthermore, the wheel rim element 407 may be coated with a metal sheet. Furthermore, the wheel rim element 407 may have metal elements 406, which may be arranged one after another, in particular spaced at a distance from each other, along a circumference of the wheel rim element 407. The metal elements 406 may have a larger thickness than a thickness of the wheel rim element 407.

The metal elements 406 can have at least one metallic surface coating (and consist, for example, of a plastic material), or may consist of a metal compound, in particular of an aluminium compound.

A filling material 408, in particular an air hose or an elastic foamed material, may be applied on a radial outer surface of the wheel rim element 407. For example, the ribbon of the wheel rim element 407 can be formed thinly in order to ensure the elastic deformability on the one hand and a sufficiently stable shape conservation without influence of the impact force [on the other hand]. In order to replicate close to reality a wheel rim of a real wheel frame, the filling material may be applied. The filling material may be, for example, elastically deformable, even without influence of the impact force.

A tyre 409, in particular a rubber tyre, is arranged at a radial outer surface of the wheel rim element. The tyre 409 can, for example, be a usual profile tyre for vehicles, for example a bicycle tyre (mantle), which has a usual tyre profile. The filling material 408 is arranged between the tyre 409 and the wheel rim element 407.

The wheel 107 further also may have an elastic pulling element (or tie) 402. The elastic pulling element 402 can be formed according to the pulling element 202 for the vehicle 100 described at the beginning. The elastic pulling element 402 may be connected to the wheel hub 108 and the spoke 401, such that upon influence of the impact force the pulling element 402 may remain fixed to the wheel hub 108 and the spoke 401.

In addition or alternatively, the elastic pulling element 402 may be connected to the wheel rim element 407 and the spoke 401, such that upon influence of the impact force the pulling element 402 may remain attached to the wheel rim element 407 and the spoke 401, wherein the elastic pulling element 402 may transmit exclusively tensile forces between the wheel rim element 407 and the spoke 401. Thus, the elastic pulling element 402 can deform elastically upon influence of the impact force, without the element releasing a connection to the spoke 401 and/or the wheel hub 108 and/or the wheel rim element 407. Thus, the spoke 401 can release non-destructively from the wheel hub 108 and/or the wheel rim element 407, may however be held further on indirectly at the wheel hub 108 and/or the wheel rim element 407, for example, due to the elastic pulling element 402.

On the one hand, the elastic pulling element may contribute further to the damping of the impact force. On the other hand, the spoke 401 may be furthermore connected via the elastic pulling element 402 to the wheel hub 108 and/or the wheel rim element 407 after the impact, i.e. after the releasing of the spoke 401 from the wheel hub 108. Thus, the spoke 401 can be quickly supplied and attached to the attachment point at the wheel hub 108 and/or the wheel rim element 107 in a simple and quick manner.

As is shown in FIG. 4, the spoke 401 may have a hollow profile. The elastic pulling element 402 may extend within the hollow profile.

For fixing the elastic pulling element 402, the latter may have a thickening 405, in particular a knot, wherein the thickening 405 may be larger than an opening cross-section of the hollow profile. Thus, the elastic pulling element 405 can be inserted, for example, through the hollow profile of the spoke 401 and may protrude at a front face. At this front face, for example a knot or another thickening can be provided, such that a slipping through into the interior of the hollow profile may be prevented.

FIG. 5 shows the wheel from FIG. 4, wherein the elastic pulling element 402 is shown in a stretched state and the spoke 401 is shown with its second end 404 in a released state from the wheel rim element 407. As is shown, the spokes 401 may be fixed with the first end 403 to the wheel hub 108 and with the second end 404 to the wheel rim element 407. After the influence of the impact force, for example, the spoke 401 can detach from the wheel rim element 407, wherein nevertheless a connection may exist via the elastic pulling element 402. Since the elastic pulling element 402 may be elastically deformable, the wheel 107 can be assembled easily for an anew test use, wherein the spoke 401 may be inserted anew into a corresponding receiving bore at the wheel rim element 407.

FIG. 6 shows a magnified representation of a wheel construction in the wheel rim area. The wheel rim element 407 may be formed ribbon-shapedly (or in the shape of a ribbon), wherein the ribbon may be connected at two ends. Foam may be applied at the radial outer side of the wheel rim element 407 as a filling material (or padding) 408, in order to simulate a real thickness of a real wheel rim element of a bicycle 100. A tyre 409 may be provided on the filling material 408. Thus, this assemblage may have a radial extension according to a real bicycle wheel. The spoke 401 can be inserted into a receiving bore of the wheel rim element 407. In FIG. 6, the spoke 401 is shown in a released state, wherein only the elastic pulling element 402 may be guided through in the receiving bore. At the radial outer side of the wheel rim element 407, the elastic pulling element 402 may have a thickening 405 to prevent a sliding out.

Furthermore, it is shown in FIG. 6, that a clamping element 601, such as for example a clamping ring made of a plastic material, can be fixed in the receiving bore, in order to ensure an improved and gentle fixation of the elastic pulling element 402.

Furthermore, it is shown again in the magnified representation that metal elements 406 may be arranged spaced at a distance along the circumference direction of the wheel rim element 407.

Figure 7:
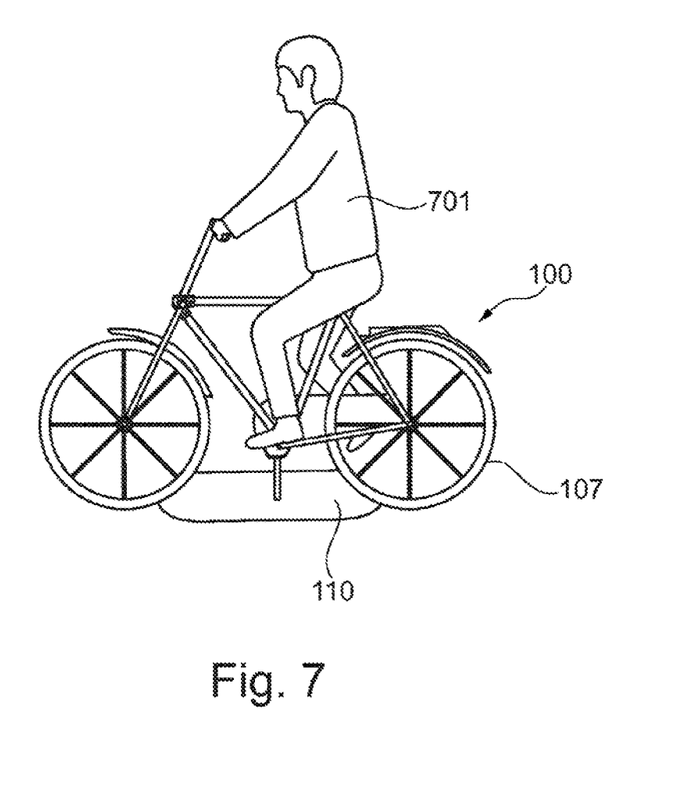
FIG. 7 shows a side view of a bicycle as a vehicle with a dummy as a bicycle driver, according to an exemplary embodiment of the present invention.

FIG. 7 shows a side view of a bicycle 100 as the vehicle according to FIG. 1 with a dummy 701 as a bicycle driver. The wheel 107 may be fixed rotatably. During the test for a driver assistance system, the wheel 107 can rotate, for example due to a contact with the ground, such that a simulation close to reality may be made possible during the test. Furthermore, the bicycle 100 may be fixed on the base element 110, which may be pulled over the ground. As is clarified in FIG. 7, the bicycle 100 together with the dummy 701 may form a realistic collision model, which may have identical dimensions in comparison to a real bicycle driver with a bicycle.

Supplementarily it is to be noted that "comprising" or "having" does not exclude other elements or steps, and that "a" or "an" does not exclude a plurality. Furthermore, it should be noted that features or steps which have been described with reference to one of the embodiment examples above, can also be used in combination with other features or steps of other embodiment examples described above. Reference numerals in the claims are not to be construed as limitations.

LIST OF REFERENCE NUMERALS

100 vehicle, bicycle
101 base body
102 strut
103 frame element
104 joining link
105 vehicle handle bar
106 vehicle saddle
107 wheel
108 wheel hub
109 rod
110 base element
201 clamping element
202 elastic pulling element
401 spoke
402 elastic pulling element
403 first end
404 second end
405 thickening
406 metal element
407 wheel rim element
408 filling material
409 tyre
601 clamping element
701 dummy

The invention claimed is:

1. A vehicle for performing tests for a driver assistance system, comprising:
   a vehicle having a base body, wherein the vehicle is structured to be subject to a collision with a collision body;
   at least one strut, wherein the strut is dimensionally stable absent an influence of an impact force, and wherein the strut is elastically deformable upon the influence of the impact force of the collision of the vehicle and the collision body; and
   an elastic clamping clip located at the base body, wherein the elastic clamping clip detachably retains the strut to the base body such that upon the influence of the impact force the strut is non-destructively detachable from the base body.

2. The vehicle of claim 1, wherein the base body is formed more rigid than the strut.

3. The vehicle of claim 1, wherein the strut is formed from an elastic plastic material having a modulus of elasticity of 1000 N/mm$^2$ to 3000 N/mm$^2$.

4. The vehicle of claim 3, wherein the strut has an elastic limit of 40 N/mm$^2$ to 70 N/mm$^2$.

5. The vehicle of claim 1, further comprising an elastic pulling element, wherein the pulling element is connected to the base body and the strut, wherein the strut includes a hollow profile, and wherein the elastic pulling element extends within the hollow profile.

6. The vehicle of claim 1, wherein the base body is a frame consisting of a plurality of frame elements, wherein a joining link is utilized to couple two frame elements and wherein the joining link includes a receiving bore, wherein the vehicle further includes a handle bar assembly, and wherein the receiving bore is configured to detachably receive at least a portion of the handle bar assembly.

7. The vehicle of claim 6, further comprising a dummy element, wherein the dummy element is attachable to the frame.

8. A collision testing vehicle for performing tests with a driver assistance system, comprising:
   a vehicle having a vehicle body and at least one wheel, wherein the vehicle is structured to be subject to an impact force during a collision with a collision body;
   a detachable support located at one of the vehicle body and the wheel, wherein the detachable support is dimensionally stable prior to application of the impact force, and wherein the detachable support is elastically deformable upon the application of the impact force;

wherein the detachable support is formed from an elastic plastic material having a modulus of elasticity in the range of 1000 N/mm$^2$ to 3000 N/mm$^2$, and wherein the detachable support includes an elastic limit in the range of 40 N/mm$^2$ to 70 N/mm$^2$; and wherein the detachable support is detachably coupled with the one of the vehicle body and the wheel such that during the collision with the collision body the detachable support can non-destructively detach from the one of the vehicle body and the wheel.

9. The collision testing vehicle of claim 8, wherein the detachable support further comprises a strut detachably coupled with the vehicle body.

10. The collision testing vehicle of claim 9, wherein the wherein the vehicle body is more rigid than the strut.

11. The collision testing vehicle of claim 9, wherein the strut is detachably coupled to the vehicle body through an elastic clamping clip.

12. The collision testing vehicle of claim 11, further comprising an elastic pulling element coupled to the vehicle body and the strut.

13. The collision testing vehicle of claim 8, wherein the detachable support defines a spoke of the wheel.

14. The collision testing vehicle of claim 13, wherein the wheel further comprises a wheel hub and a wheel rim, wherein the spoke extends between the hub and the rim, and wherein a first end of the spoke is detachably connected to the wheel hub such that upon influence of the impact force the spoke is non-destructively detachable from the wheel hub.

15. The collision testing vehicle of claim 14, further comprising an elastic pulling element coupled to the wheel hub and the spoke, wherein the pulling element exclusively transmits tensile forces between the wheel hub and the spoke, and wherein the pulling element remains coupled to the wheel hub and the spoke after the collision of the vehicle and the collision body.

* * * * *